(12) United States Patent
Mai et al.

(10) Patent No.: US 8,917,498 B2
(45) Date of Patent: Dec. 23, 2014

(54) WIRING STRUCTURE BETWEEN MAIN BODY AND COVER BODY OF ELECTRONIC DEVICE

(75) Inventors: Chien Cheng Mai, New Taipei (TW); Hsiu Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 178 days.

(21) Appl. No.: 13/561,190

(22) Filed: Jul. 30, 2012

(65) Prior Publication Data

US 2013/0285475 A1    Oct. 31, 2013

(30) Foreign Application Priority Data

Apr. 30, 2012  (TW) .............................. 101208126 U

(51) Int. Cl.
*G06F 1/16*  (2006.01)
(52) U.S. Cl.
USPC ................................ 361/679.02; 361/679.08
(58) Field of Classification Search
CPC ............................. G06F 1/1616; G06F 1/1683
USPC ............. 361/679.01, 679.02, 679.08, 679.21, 361/679.26, 679.27, 679.3, 679.55–679.58
See application file for complete search history.

(56) References Cited

U.S. PATENT DOCUMENTS

| | | | | |
|---|---|---|---|---|
| 5,383,138 A | * | 1/1995 | Motoyama et al. | 361/679.27 |
| 6,377,454 B1 | * | 4/2002 | Inoue et al. | 361/679.52 |
| 7,068,496 B2 | * | 6/2006 | Wong et al. | 361/679.28 |
| 7,280,348 B2 | * | 10/2007 | Ghosh | 361/679.27 |
| 7,586,743 B2 | * | 9/2009 | Lin | 361/679.55 |
| 8,654,520 B2 | * | 2/2014 | Lin et al. | 361/679.27 |
| 2004/0057197 A1 | * | 3/2004 | Hill et al. | 361/683 |
| 2012/0307441 A1 | * | 12/2012 | Hung et al. | 361/679.09 |

* cited by examiner

*Primary Examiner* — Yuriy Semenenko
(74) *Attorney, Agent, or Firm* — Rosenberg, Klein & Lee

(57) ABSTRACT

A wiring structure between main body and cover body of electronic device includes a support connection member. The support connection member has a first pivoted section pivotally connected to the cover body and a second pivoted section pivotally connected to the main body. The first pivoted section is formed with a first pivot hole communicating with outer side. The second pivoted section is formed with a second pivot hole communicating with outer side. The support connection member is formed with a recessed receiving space between the first and second pivoted sections in communication with the first and second pivot holes. At least one conductive body is disposed in the receiving space. The conductive body has a first connection end and a second connection end respectively outward extending from the first and second pivot holes. A protection cover board is disposed in the receiving space for covering the conductive body.

23 Claims, 7 Drawing Sheets

WIRING STRUCTURE BETWEEN MAIN BODY AND COVER BODY OF ELECTRONIC DEVICE

BACKGROUND OF THE INVENTION

1. Field of the Invention

The present invention relates generally to a wiring structure between main body and cover body of electronic device, and more particularly to a wiring structure, which provides an optimal wiring path and effectively conceals the conductive body.

2. Description of the Related Art

In recent years, along with the continuous advance of electronic sciences and technologies, various portable electronic products have been developed and released to the market. As to the large-size personal document processing device, which is popularly used nowadays, such device is generally equipped with a large display screen. In order to simplify the structure and miniaturize the device, the display screen is generally a touch screen. However, in practice, it is found that with the touch screen, a user can hardly quickly and conveniently input data. As a result, when processing the documents, the working efficiency is low. To solve this problem, many improved document processing devices have been developed recently. Such document processing device has a screen and an input unit such as a keyboard, which is separated from the screen. The screen is pivotally connected to the keyboard via a support member. In this case, the personal document processing device can be co-used with a keyboard to facilitate the use and enhance working efficiency. Moreover, the screen can be pivotally rotated and closed onto the keyboard via the support member to overlap the keyboard so as to minimize the volume for easy carriage and storage.

The above electronic product is mainly divided into an upper half (screen) and a lower half (keyboard), which are interconnected by a support member in the form of a bar or a plate. In practice, the upper half (screen) and the lower half (keyboard) must be power-connected and signal-connected with each other via various wires. Currently, the power and signal wires are generally directly exposed to outer side and attached to the surface of the support member. Under such circumstance, the wires can be hardly effectively protected. In addition, the tidiness of the appearance of the electronic product is deteriorated. In some other type of electronic products, a raised cover member is disposed on the surface of the support member along the path of the wires to conceal the wires and provide a certain protection for the wires. In this case, the appearance of the electronic device can be kept tidy. However, the cover occupies much room. This is unfavorable to the trend toward miniaturization of the electronic product.

SUMMARY OF THE INVENTION

It is therefore a primary object of the present invention to provide a wiring structure between main body and cover body of electronic device. Without affecting the wiring function, the wiring structure can conceal the conductive body to keep the appearance of the electronic device tidy and beautiful.

It is a further object of the present invention to provide the above wiring structure between main body and cover body of electronic device. The wiring structure can provide a full protection effect for the conductive body to avoid damage of the conductive body by external force. Therefore, the lifetime of the conductive body is prolonged.

It is still a further object of the present invention to provide the above wiring structure between main body and cover body of electronic device. The wiring structure provides an optimal wiring path to reduce the consumption of the material of the conductive body so as to lower the manufacturing cost.

To achieve the above and other objects, the wiring structure between main body and cover body of electronic device of the present invention includes: a support connection member pivotally connected between the cover body and the main body, the support connection member having a first pivoted section and a second pivoted section, the first pivoted section being formed with a first pivot hole communicating with outer side, the second pivoted section being formed with a second pivot hole communicating with outer side, the support connection member being further formed with a recessed receiving space between the first and second pivoted sections, the receiving space communicating with the first and second pivot holes; and at least one conductive body disposed in the receiving space. The conductive body has a first connection end and a second connection end. The first and second connection ends respectively extend from the first and second pivot holes to outer side of the main body and the cover body.

In the above wiring structure, the conductive body is a flexible printed circuit board.

In the above wiring structure, the conductive body is multiple densely arranged coaxial cables.

In the above wiring structure, the first pivoted section is pivotally connected to the cover body, while the second pivoted section is pivotally connected to the main body.

In the above wiring structure, a protection cover board is disposed in the receiving space of the support connection member for covering the conductive body.

In the above wiring structure, a middle section of the first pivot hole of the first pivoted section is formed with a middle notch communicating with outer side. The receiving space communicates with the middle notch through at least one communication hole.

In the above wiring structure, the second pivoted section is formed with a communication opening in communication with the receiving space and the second pivot hole.

In the above wiring structure, the second pivot hole passes through the second pivoted section between two lateral sides thereof. A pivot pin is connected to one end of the second pivot hole. A lateral conductive sleeve is inserted in the other end of the second pivot hole.

The present invention can be best understood through the following description and accompanying drawings, wherein:

DETAILED DESCRIPTION OF THE PREFERRED EMBODIMENTS

Figure 1:
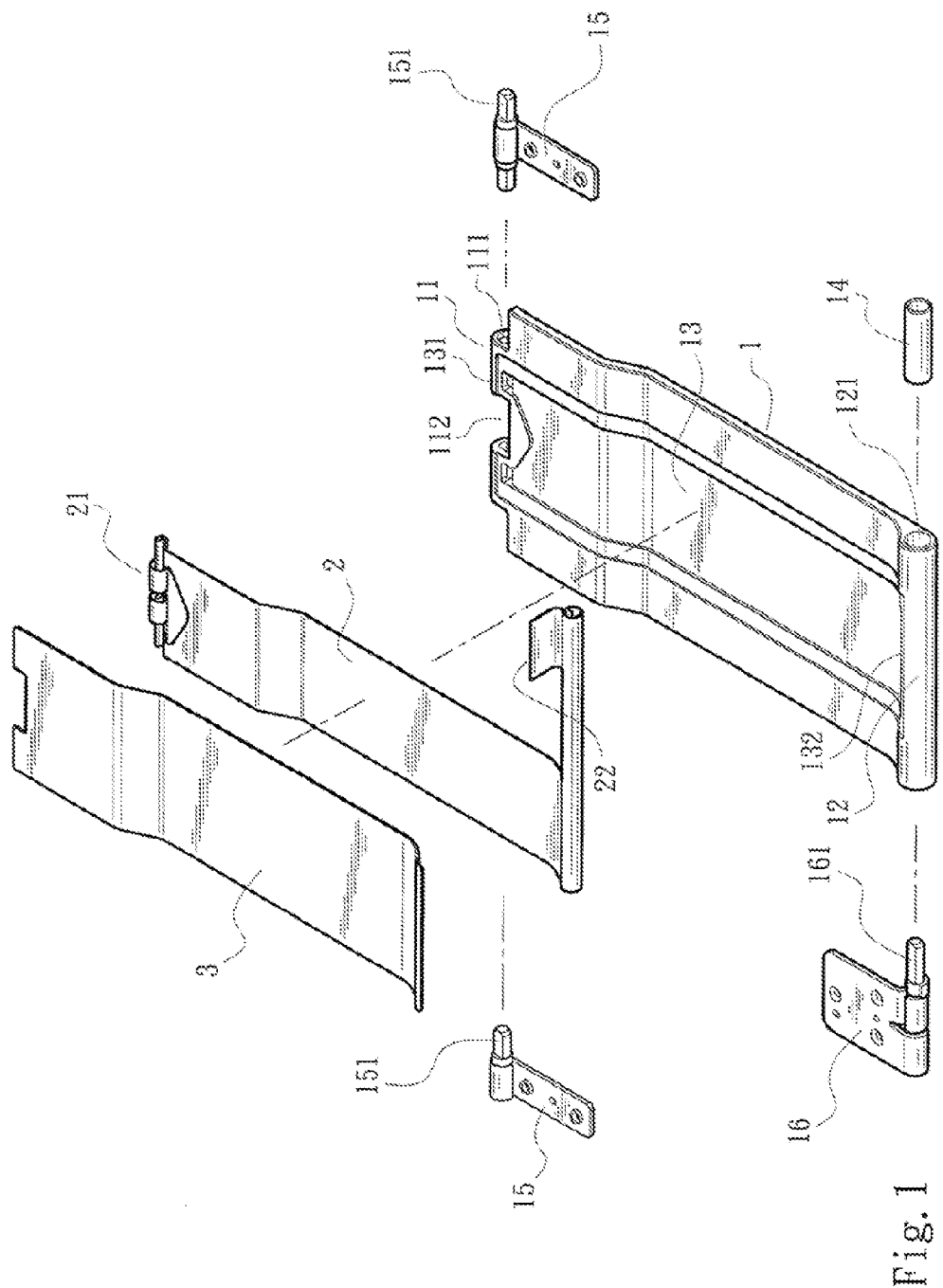
FIG. 1 is a perspective exploded view of a first embodiment of the present invention.
Figure 2:
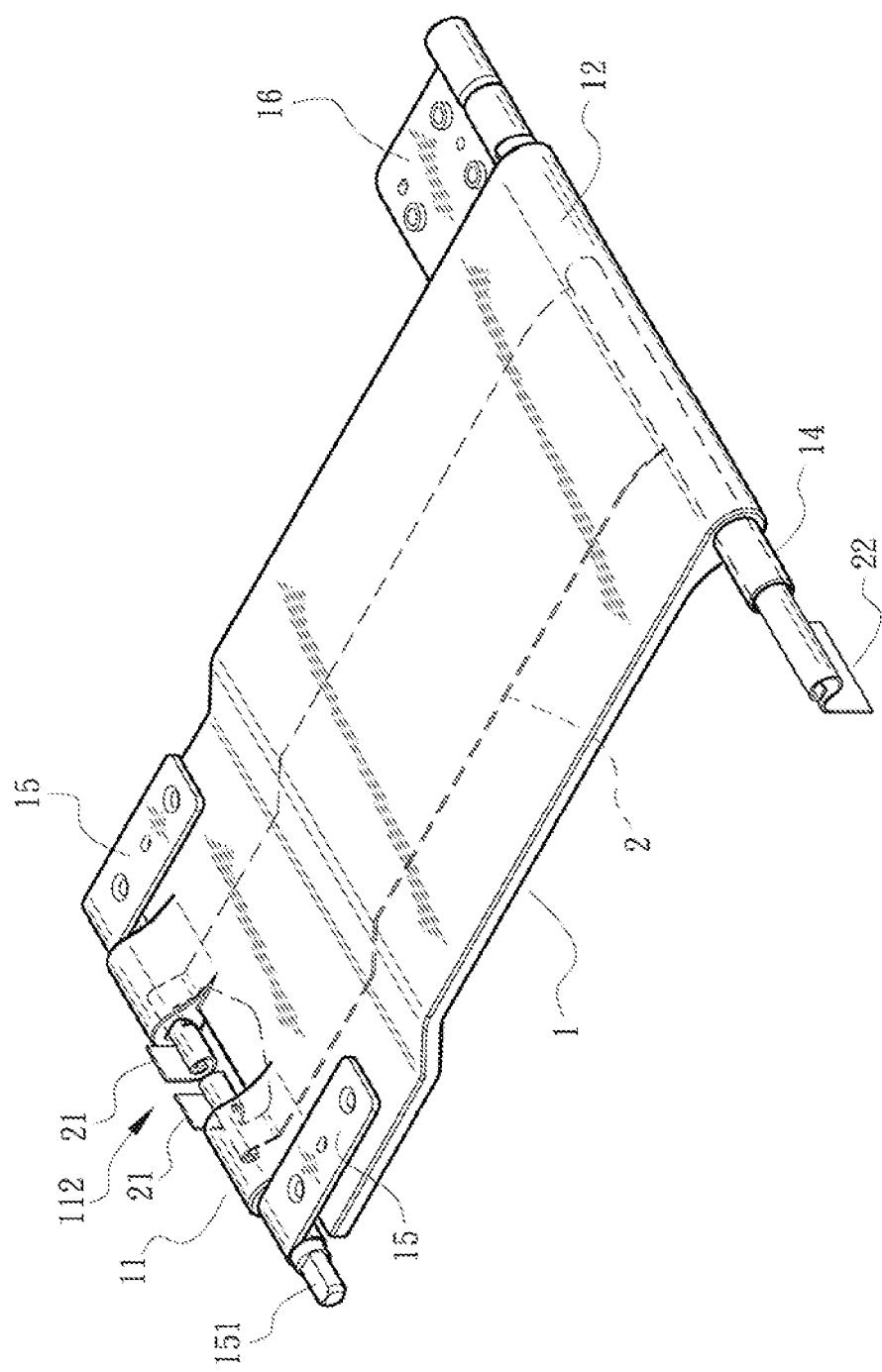
FIG. 2 is a perspective assembled view of the first embodiment of the present invention.
Figure 3:
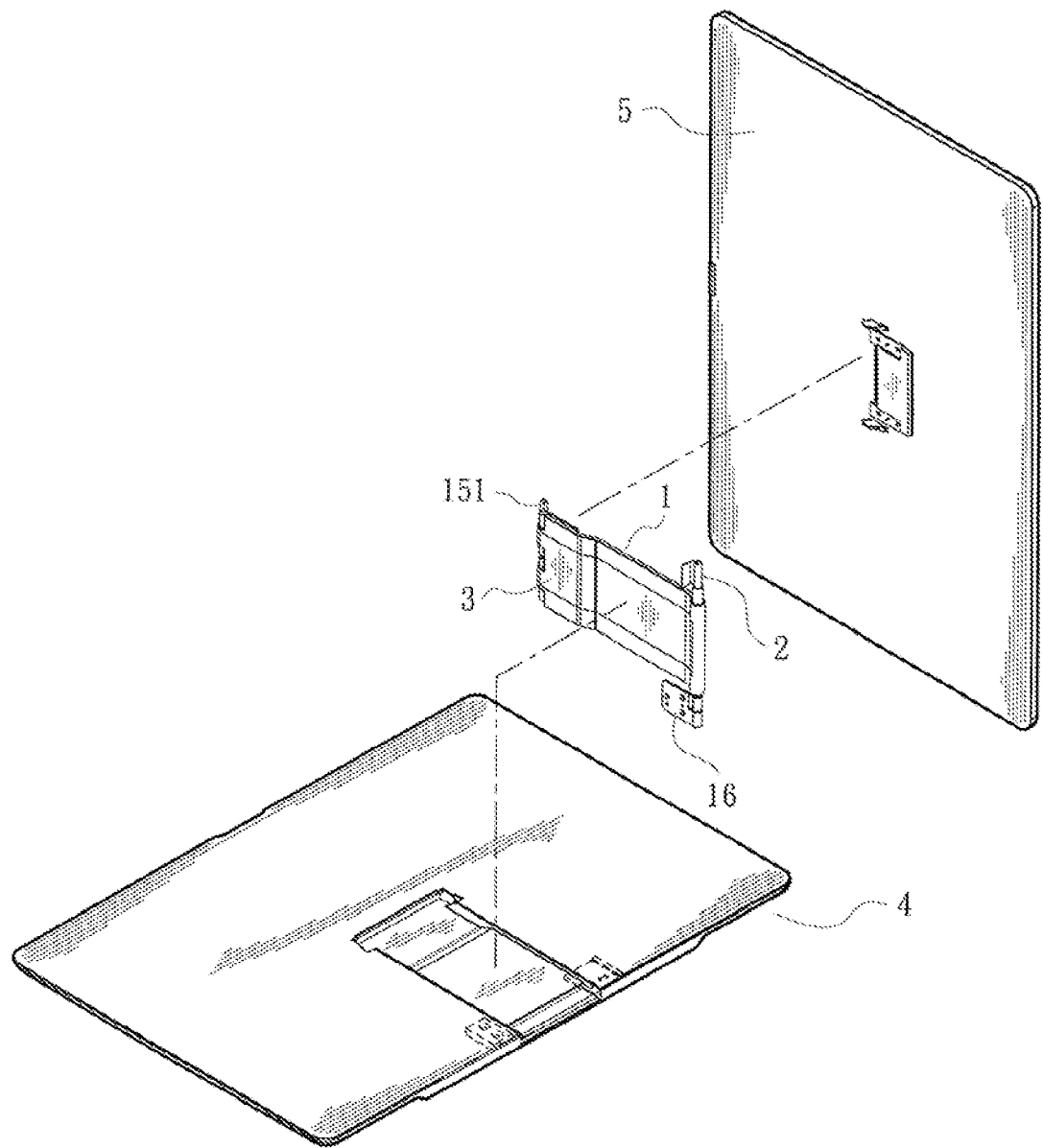
FIG. 3 is a perspective exploded view showing that the first embodiment of the present invention is applied to relevant components of the electronic device.

Please refer to FIGS. 1 to 3. According to a first embodiment, the wiring structure between main body and cover body of electronic device of the present invention includes a support connection member 1, a conductive body 2 and a protection cover board 3. The support connection member 1 has a first pivoted section 11 and a second pivoted section 12 at two end sections. The first pivoted section 11 is formed with a first pivot hole 111 communicating with two lateral sides. The second pivoted section 12 is formed with a second pivot hole 121 communicating with two lateral sides. A middle section of the first pivot hole 111 of the first pivoted section 11 is formed with a middle notch 112 communicating with outer side. The support connection member 1 is further formed with a receiving space 13 with an opening between the first and second pivoted sections 11, 12. One end of the receiving space 13 communicates with two lateral sides (the first pivot hole 111) of the middle notch 112 via two communication holes 131. The other end of the receiving space 13 communicates with the second pivot hole 121 via a communication opening 132. A lateral conductive sleeve 14 is inserted in one end of the second pivot hole 121. In this embodiment, the conductive body 2 is a flexible printed circuit board (FPC) disposed in the receiving space 13. Two end sections of the conductive body 2 are respectively formed with a forked first connection end 21 and a transversely extending second connection end 22. The first connection end 21 can pass through the two communication holes 131 and the first pivot hole 111 to outward extend from the middle notch 112. The second connection end 22 can pass through the communication opening 132, the second pivot hole 121 and the lateral conductive sleeve 14 to transversely outward extend from the lateral conductive sleeve 14. The protection cover board 3 is connected to the opening of the receiving space 13 to cover and protect the conductive body 2.

When assembled, two pivot pins 151 disposed on two pivot seats 15 are respectively connected to two end sections of the first pivot hole 111. The pivot seats 15 are disposed on a cover body 5. A pivot pin 161 disposed on a pivot seat 16 is connected to one end of the second pivot hole 121, which end is distal from the lateral conductive sleeve 14. The pivot seat 16 is disposed on a main body 4. Accordingly, the support connection member 1 is pivotally connected between the cover body 5 and the main body 4.

Figure 4:
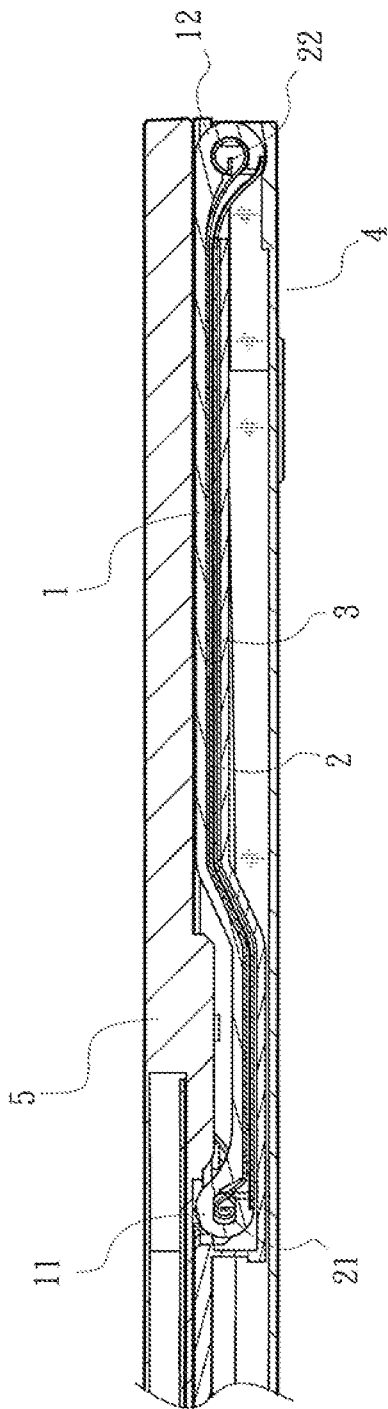
FIG. 4 is a sectional assembled view showing that the first embodiment of the present invention is connected to the relevant components of the electronic device in a closed state.
Figure 5:
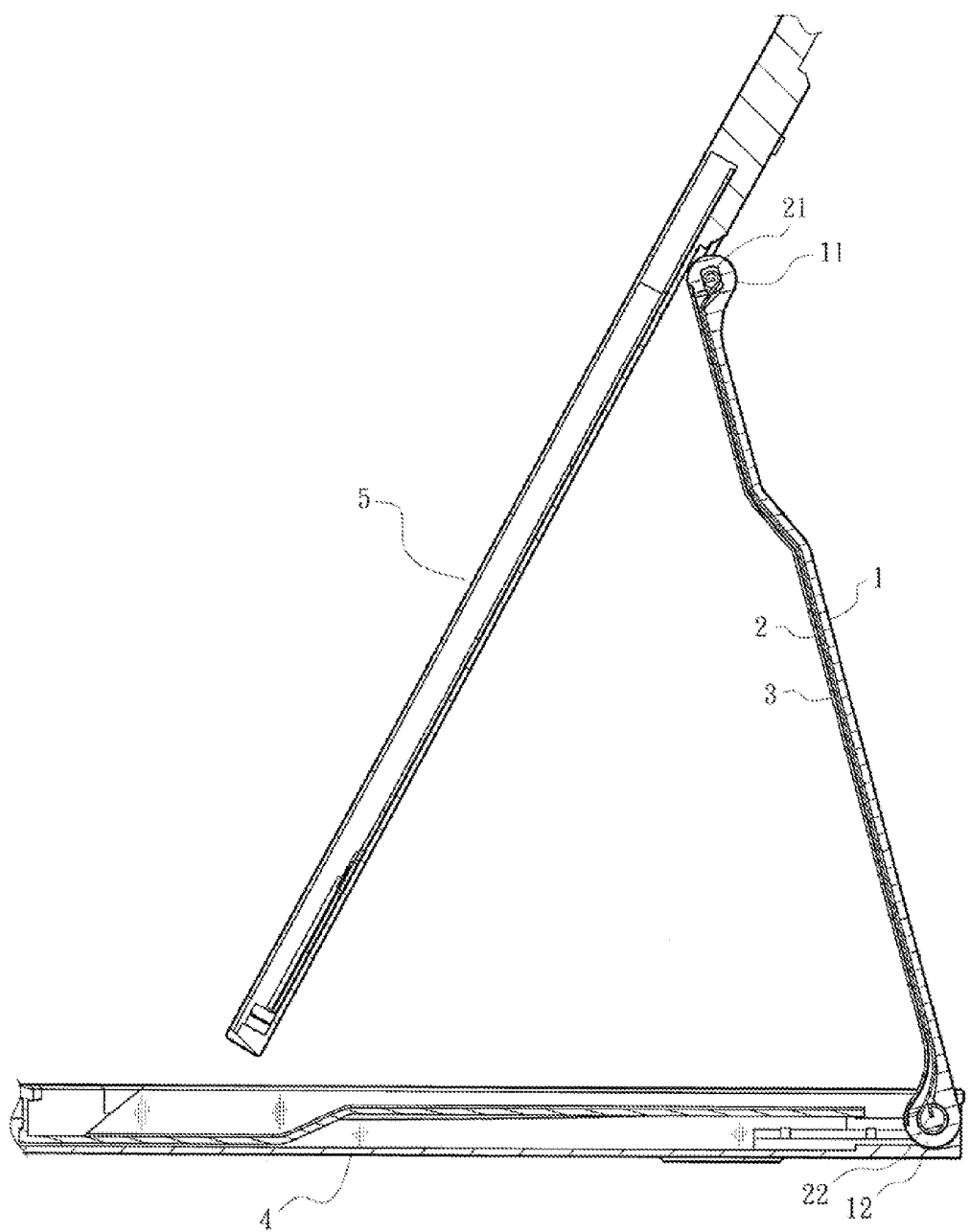
FIG. 5 is a sectional assembled view showing that the first embodiment of the present invention is connected to the relevant components of the electronic device in an opened state.

Please now refer to FIGS. 4 and 5. In practice, the conductive body 2 (FPC) is concealed in the receiving space 13 of the support connection member 1 to power-connect and signal-connect the main body 4 with the cover body 5. In operation, the first and second connection ends 21, 22 of the conductive body 2 totally will not affect the pivotal rotation between the main body 4 and the cover body 5. Therefore, no matter whether the cover body 5 and the main body 4 are in a closed state (as shown in FIG. 4) or in an opened state (as shown in FIG. 5), the conductive body 2 (FPC) is always properly covered without being exposed to outer side. Accordingly, the electronic device composed of the main body 4 and the cover body 5 can have a tidy appearance. Also, the conductive body 2 (FPC) is effectively protected so that the lifetime of the conductive body 2 (FPC) can be prolonged.

Figure 6:
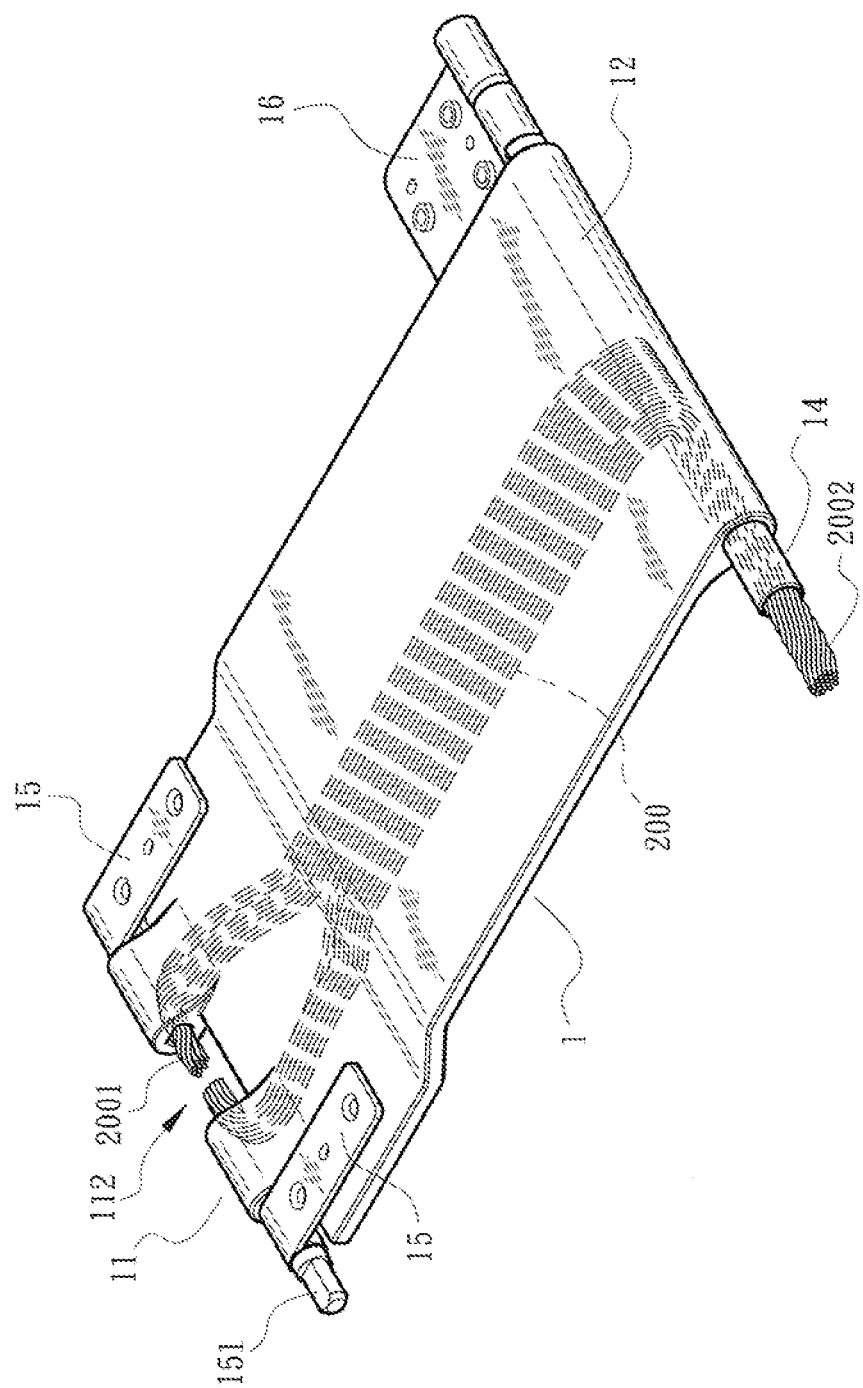
FIG. 6 is a perspective assembled view of a second embodiment of the present invention.

FIG. 6 shows a second embodiment of the wiring structure between main body and cover body of electronic device of the present invention. According to the second embodiment, the wiring structure of the present invention includes a conductive body 200, a support connection member 1 and a protection cover body 3 identical to that of the first embodiment. The conductive body 200 is multiple densely arranged coaxial cables. In the receiving space 13, the coaxial cables (the conductive body 200) are adjacently spread in a one-layer form, whereby the conductive body 200 has such a height as to be received in the receiving space 13. In addition, as necessary, first end sections of the coaxial cables (the conductive body 200) can be bundled to form two first connection ends 2001.

The first connection ends 2001 pass through the communication holes 131 and the first pivot hole 111 to extend into the middle notch 112. Also, second end sections of the coaxial cables (the conductive body 200) are bundled to form a second connection end 2002. The second connection end 2002 passes through the communication opening 132 (not shown in FIG. 6), the second pivot hole 121 and the lateral conductive sleeve 14 to outward extend from the lateral conductive sleeve 14. Such arrangement can achieve the same effect as the conductive body 2 of the first embodiment. The support connection member 1 and the protection cover board 3 of the second embodiment are identical to those of the first embodiment in connection relationship and effect and thus will not be repeatedly described hereinafter.

Figure 7:
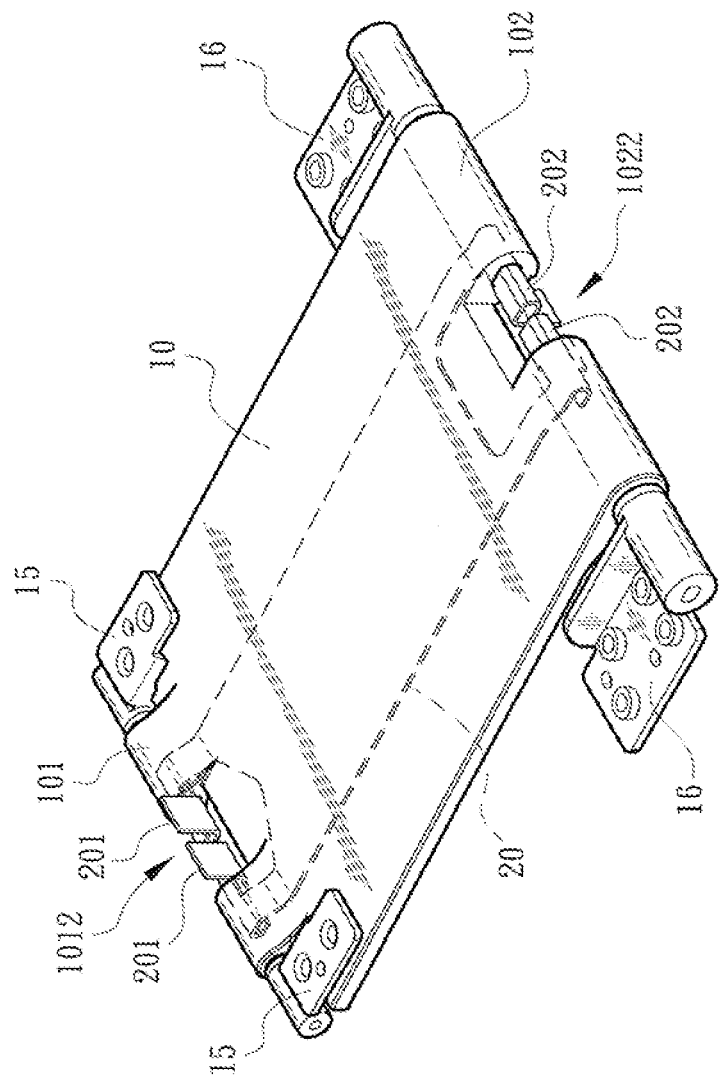
FIG. 7 is a perspective assembled view of a third embodiment of the present invention.

FIG. 7 shows a third embodiment of the wiring structure between main body and cover body of electronic device of the present invention. According to the third embodiment, the wiring structure of the present invention includes a support connection member 10 and a conductive body 20. The support connection member 10 has a first pivoted section 101 and a second pivoted section 102 at two end sections. A middle section of the first pivoted section 101 is formed with a middle notch 1012 open to outer side. A middle section of the second pivoted section 102 is formed with a middle notch 1022 open to outer side. Two lateral sides of the middle notches 1012, 1022 communicate with a receiving space (not denoted with reference numeral) formed in the support connection member 10. Two pivot seats 15 with pivot pins are respectively connected to two end sections of the first pivoted section 101. The pivot seats 15 are disposed on the cover body 5). Two pivot seats 16 with pivot pins are respectively connected to two end sections of the second pivoted section 102. (The pivot seats 16 are disposed on the main body 4). Two end sections of the conductive body 20 are respectively formed with a forked first connection end 201 and a forked second connection end 202. The first connection end 201 outward extends from two lateral sides of the middle notch 1012. The second connection end 202 outward extends from two lateral sides of the middle notch 1022. The other parts of the support connection member 10 and the conductive body 20 of the second embodiment are identical to those of the first embodiment in structural characteristic and connection relationship and thus will not be repeatedly described hereinafter. The structural form of the third embodiment also can achieve the same concealing and protection effect for the conductive body 20 as the first embodiment.

In conclusion, the wiring structure between main body and cover body of electronic device of the present invention provides an optimal wiring path and enhances the tidiness of the appearance of the electronic device.

The above embodiments are only used to illustrate the present invention, not intended to limit the scope thereof. Many modifications of the above embodiments can be made without departing from the spirit of the present invention.

What is claimed is:

1. A wiring structure between a main body and a cover body of an electronic device, the wiring structure comprising:
   a support connection member pivotally connected between the cover body and the main body, the support connection member having a first pivoted section and a second pivoted section, the first pivoted section defining a first pivot axis for pivotal coupling to one of the cover and main bodies, the first pivoted section being formed with a first pivot hole extending along the first pivot axis, the second pivoted section defining a second pivot axis for pivotal coupling to the other of the cover and main bodies, the second pivoted section being formed with a second pivot hole extending along the second pivot axis, the support connection member being further formed with a recessed receiving space between the first and second pivoted sections, the receiving space communicating with the first and second pivot holes; and at least one conductive body disposed in the receiving space for electrical power and signal interconnection between the cover body and the main body, the conductive body having a first connection end and a second connection end, the first and second connection ends respectively extending coaxially with the first and second pivot axes in the first and second pivot holes.

2. The wiring structure as claimed in claim 1, wherein the conductive body is a flexible printed circuit board.

3. The wiring structure as claimed in claim 1, wherein conductive body is multiple densely arranged coaxial cables.

4. The wiring structure as claimed in claim 1, wherein the first pivoted section is pivotally connected to the cover body, while the second pivoted section is pivotally connected to the main body.

5. The wiring structure as claimed in claim 1, wherein a middle section of the first pivot hole of the first pivoted section is formed with a middle notch communicating with outer side, the receiving space communicating with the middle notch through at least one communication hole.

6. The wiring structure as claimed in claim 2, wherein a middle section of the first pivot hole of the first pivoted section is formed with a middle notch communicating with outer side, the receiving space communicating with the middle notch through at least one communication hole.

7. The wiring structure as claimed in claim 3, wherein a middle section of the first pivot hole of the first pivoted section is formed with a middle notch communicating with outer side, the receiving space communicating with the middle notch through at least one communication hole.

8. The wiring structure as claimed in claim 4, wherein a middle section of the first pivot hole of the first pivoted section is formed with a middle notch communicating with outer side, the receiving space communicating with the middle notch through at least one communication hole.

9. The wiring structure as claimed in claim 1, wherein the second pivoted section is formed with a communication opening in communication with the receiving space and the second pivot hole.

10. The wiring structure as claimed in claim 2, wherein the second pivoted section is formed with a communication opening in communication with the receiving space and the second pivot hole.

11. The wiring structure as claimed in claim 3, wherein the second pivoted section is formed with a communication opening in communication with the receiving space and the second pivot hole.

12. The wiring structure as claimed in claim 4, wherein the second pivoted section is formed with a communication opening in communication with the receiving space and the second pivot hole.

13. The wiring structure as claimed in claim 5, wherein the second pivoted section is formed with a communication opening in communication with the receiving space and the second pivot hole.

14. The wiring structure as claimed in claim 9, wherein the second pivot hole passes through the second pivoted section between two lateral sides thereof, a pivot pin being connected to one end of the second pivot hole, a lateral conductive sleeve being inserted in the other end of the second pivot hole.

15. The wiring structure as claimed in claim 13, wherein the second pivot hole passes through the second pivoted section between two lateral sides thereof, a pivot pin being connected to one end of the second pivot hole, a lateral conductive sleeve being inserted in the other end of the second pivot hole.

16. The wiring structure as claimed in claim 1, wherein a protection cover board is disposed in the receiving space of the support connection member for covering the conductive body.

17. The wiring structure as claimed in claim 2, wherein a protection cover board is disposed in the receiving space of the support connection member for covering the conductive body.

18. The wiring structure as claimed in claim 3, wherein a protection cover board is disposed in the receiving space of the support connection member for covering the conductive body.

19. The wiring structure as claimed in claim 4, wherein a protection cover board is disposed in the receiving space of the support connection member for covering the conductive body.

20. The wiring structure as claimed in claim 5, wherein a protection cover board is disposed in the receiving space of the support connection member for covering the conductive body.

21. The wiring structure as claimed in claim 9, wherein a protection cover board is disposed in the receiving space of the support connection member for covering the conductive body.

22. The wiring structure as claimed in claim 13, wherein a protection cover board is disposed in the receiving space of the support connection member for covering the conductive body.

23. The wiring structure as claimed in claim 14, wherein a protection cover board is disposed in the receiving space of the support connection member for covering the conductive body.

* * * * *